Kuehnhold & Sturges,
Harness Tree,
Nº 19,371.      Patented Feb. 16, 1858.
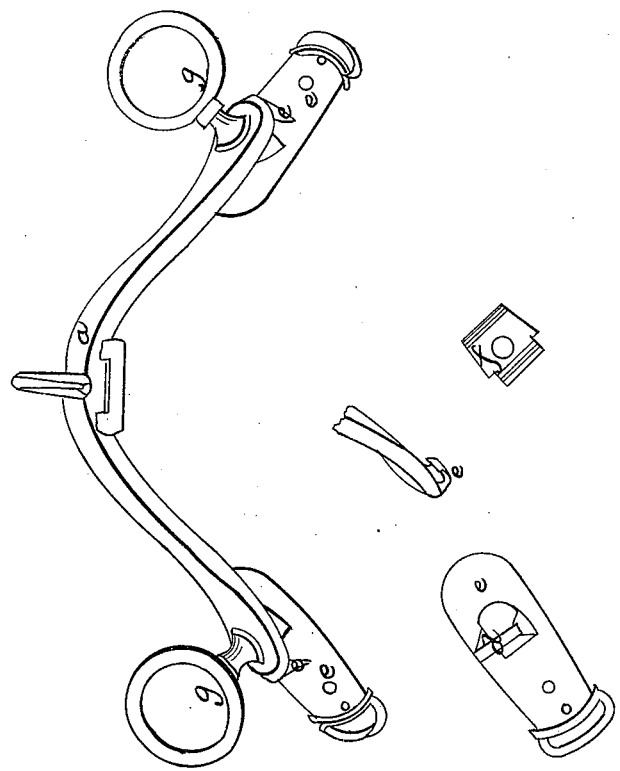
Inventors;
F. B. Kuehnhold
& D. B. Sturges

UNITED STATES PATENT OFFICE.

F. B. KUEHNHOLD AND D. B. STURGES, OF NEWARK, NEW JERSEY.

HARNESS-TREE.

Specification of Letters Patent No. 19,371, dated February 16, 1858.

*To all whom it may concern:*

Be it known that we, FERDINAND B. KUEHNHOLD and DAVID B. STURGES, of Newark, in the county of Essex and State of New Jersey, have invented a new and Improved Mode of Connecting Pads to Metallic Harness-Trees; and we do hereby declare that the following is a full and exact description thereof, reference being had to the accompanying drawings and to the letters marked thereon.

The nature of our invention consists in so constructing a metallic harness tree, that it will operate equally easy on any horse, that it is more durable, of a neater and plainer finish, and that it can be furnished with less expense than any other adjusting tree now in use.

To enable others skilled in the art to use and manufacture our invention, we will proceed to describe its construction and operation.

We construct the tree including the joint in four separate pieces, viz: (*a*) represents the tree, with the inside hook (*b b*) on the end, which forms two thirds of the joint for the reception of the cross bar (*d*) and the pad (*e*) the grooved nut (*f*) complete the joint and is held together by the screw of the terrett (*g*).

The advantage of our new constructed joint to connect the pad to the tree, consists first: in the concealed joint, which is in that manner protected from the influence of the weather, and makes a permanent and neat finish; more durable on account of its long entirely covered bearings, and the weight and pressure acts only on the end of the tree and not on the terret or nut. It can be taken apart and put together quite easily and therefore makes it more desirable to harness makers.

What we claim as our invention and desire to secure by Letters Patent, is—

The hook (*b*) in combination, with the grooved nut (*f*) and cross-bar (*d*) to form the concealed joint, in the manner and for the purpose specified.

FERDINAND B. KUEHNHOLD.
D. B. STURGES.

Witnesses:
D. W. BALDWIN,
G. W. CROSS.